United States Patent
Chen et al.

(10) Patent No.: US 6,406,143 B1
(45) Date of Patent: Jun. 18, 2002

(54) INK JET PRINTING METHOD

(75) Inventors: Tienteh Chen, Penfield, NY (US); Russell A. Stapleton, Akron, OH (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/558,763

(22) Filed: Apr. 26, 2000

(51) Int. Cl.⁷ .................................................. B41J 2/01
(52) U.S. Cl. ........................ 347/105; 347/106; 428/195; 523/160
(58) Field of Search ................................. 347/105, 106; 525/327.4, 333.3, 385, 404, 63; 428/195; 503/218, 212, 220; 427/105

(56) References Cited

U.S. PATENT DOCUMENTS

| | | | |
|---|---|---|---|
| 5,364,909 A | * 11/1994 | Guo et al. | 525/69 |
| 5,772,741 A | * 6/1998 | Spinelli | 106/31.25 |
| 5,948,843 A | 9/1999 | Boutier et al. | |
| 6,166,149 A | * 12/2000 | Yamaguchi et al. | 524/404 |

FOREIGN PATENT DOCUMENTS

EP          0 889 102 A2     1/1999

\* cited by examiner

*Primary Examiner*—Bruce H. Hess
*Assistant Examiner*—Michael E. Grendzynski
(74) *Attorney, Agent, or Firm*—Harold E. Cole

(57) ABSTRACT

An ink jet printing method comprising the steps of:
  A) providing an ink jet printer that is responsive to digital data signals;
  B) loading the printer with ink jet recording elements;
  C) loading the printer with an ink jet ink composition; and
  D) printing on the ink jet recording element using the ink jet ink in response to the digital data signals;

wherein the ink jet ink composition comprises from about 0.5% to about 30% by weight of a pigment, a carrier, a humectant and a dispersant in a ratio of dispersant:pigment from about 0.1:1 to about 5:1; the dispersant being a graft copolymer having the following formula:

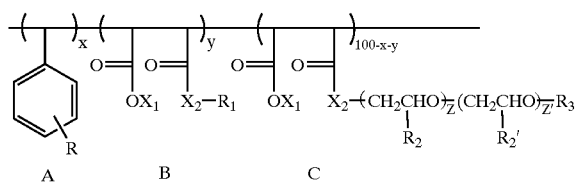

wherein

R is H, halogen, an alkyl group of from about 1 to about 15 carbon atoms or an aryl group of from about 6 to about 18 carbon atoms;

$R_1$ is H, an alkyl group of from about 1 to about 15 carbon atoms, an aryl group of from about 6 to about 18 carbon atoms, arylalkyl, or a polydimethylsiloxane;

$X_1$ is H, Na or K;

$X_2$ is NH or O;

$R_2$ and $R_2'$ are H or $CH_3$;

$R_3$ is H, $CH_3$, $C_2H_5$ or $C_3H_7$;

x is from about 30 to about 90 weight ratio;

y is from 0 to about 30 weight ratio; and z and z' are from about 3 to about 50.

19 Claims, No Drawings

INK JET PRINTING METHOD

CROSS REFERENCE TO RELATED APPLICATIONS

Reference is made to commonly assigned, co-pending U.S. patent application Ser. No. 09/558,614 by Chen et al., filed concurrently herewith entitled "Ink Jet Ink"; the disclosure of which is hereby incorporated by reference, now abandoned.

FIELD OF THE INVENTION

This invention relates to an ink jet printing method employing graft copolymers as pigment ink stabilizers.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor lightfastness. When water is used as the carrier, such inks also generally suffer from poor water fastness.

In pigment-based inks, the colorant exists as discrete particles. These pigment particles are usually treated with addenda known as dispersants or stabilizers which serve to keep the pigment particles from agglomerating and settling out of the carrier. Water-based pigmented inks are prepared by incorporating the pigment in the continuous water phase by a milling and dispersing process. Pigmented inks require a water soluble dispersant in the pigment slurry during the milling process. Such a dispersant is necessary to produce a colloidally stable mixture and an ink that can be "jetted" reliably without clogging the print head nozzles.

Dispersing agents in an ink jet ink have the dual function of helping to break down pigments to sub-micron size during the milling process and of keeping the colloidal dispersion stable and free from flocculation for a long period of time. In general, dispersions suffer from poor colloidal stability due to particle agglomeration and/or sedimentation, thus limiting the usefulness of the dispersions in inks.

Although a wide variety of dispersing agents are known for pigmented ink jet inks, they are not without certain problems. For example, many dispersing agents are very selective as far as being able to disperse pigments to sub-micron size. In many instances, each class of pigments may require a specific dispersing agent. Another problem encountered with some dispersing agents is that the resulting inks suffer from unacceptable image quality properties. This can include unacceptable coalescence, banding, bleeding, densities, or other defects seen on the final printed image. Yet another problem with many commercially available dispersants is that they yield dispersions with very low surface tensions. Thus, there is a continuing need for improved dispersing agents for pigmented inks.

EP 0 889 102 relates to a dispersing agent of a styrene/maleic anhydride (SMA) copolymer, a reaction product of the SMA copolymer and an alcohol, or a combination of the SMA copolymer and the SMA copolymer/alcohol reaction product. There is a problem with this dispersing agent, however, in that it is not effective at high humectant levels and at high temperatures.

U.S. Pat. No. 5,948,843 relates to a lithographic printing ink containing a dispersing agent of a reaction product of an SMA copolymer and an alcohol as a pigment dispersant. There is a problem with this dispersing agent, however, in that it is not effective at high humectant levels and at high temperatures.

It is an object of this invention to provide an ink jet printing method employing a dispersant for a pigmented ink jet ink which will be effective at high humectant levels at high temperatures.

SUMMARY OF THE INVENTION

This and other objects are achieved in accordance with this invention which relates to an ink jet printing method comprising the steps of:

A) providing an ink jet printer that is responsive to digital data signals;

B) loading the printer with ink jet recording elements;

C) loading the printer with an ink jet ink composition; and

D) printing on the ink jet recording element using the ink jet ink in response to the digital data signals;

wherein the ink jet ink composition comprises from about 0.5% to about 30% by weight of a pigment, a carrier, a humectant and a dispersant in a ratio of dispersant:pigment from about 0.1:1 to about 5:1; the dispersant being a graft copolymer having the following formula:

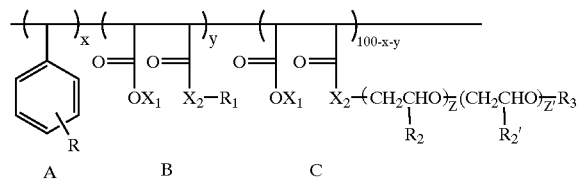

wherein

R is H, halogen, an alkyl group of from about 1 to about 15 carbon atoms or an aryl group of from about 6 to about 18 carbon atoms;

$R_1$ is H, an alkyl group of from about 1 to about 15 carbon atoms, an aryl group of from about 6 to about 18 carbon atoms, arylalkyl, or a polydimethylsiloxane;

$X_1$ is H, Na or K;

$X_2$ is NH or O;

$R_2$ and $R_2'$ are H or $CH_3$;

$R_3$ is H, $CH_3$, $C_2H_5$ or $C_3H_7$;

x is from about 30 to about 90 weight ratio;

y is from 0 to about 30 weight ratio; and z and z' are from about 3 to about 50.

The dispersants employed in the invention are effective at high humectant levels at high temperatures.

DETAILED DESCRIPTION OF THE INVENTION

In a preferred embodiment of the invention, the graft copolymer is prepared from poly(styrene-co-maleic anhydride) and either poly(ethylene oxide-co-propylene oxide) or poly(ethylene oxide). In another preferred embodiment, the mole % maleic anhydride of the poly(styrene-co-maleic anhydride) is from about 20% to about 40%. In another preferred embodiment, the molecular weight of the poly(styrene-co-maleic anhydride) is from about 1000 to about 3000 and the number average molecular weight of the poly(ethylene oxide-co-propylene oxide) or poly(ethylene oxide is from about 500 to about 3000. In still another preferred embodiment, the poly(ethylene oxide-co-propylene oxide) and poly(ethylene oxide) are amine-terminated. In yet still another preferred embodiment, the mole % ethylene oxide of the poly(ethylene oxide-co-propylene oxide) is from about 30% to about 90%.

The polymers employed in the invention are graft copolymers comprising a hydrophobic backbone and a hydrophilic side chain. In a preferred embodiment of the invention, the hydrophobic backbone is poly(styrene-co-maleic acid) or an ester of poly(styrene-co-maleic anhydride), and the hydrophilic side chain is a homo- or co-polymer of ethylene oxide and propylene oxide.

The hydrophobic portion of the polymer helps the adsorption of polymer onto the surface of the pigment while the hydrophilic portion of the polymer helps the solubility of the polymer in the pigment ink composition.

Graft copolymers employed in this invention can be prepared by two methods. The first method is to react a copolymer of poly(styrene-co-maleic anhydride) with the hydroxy- or amine-terminated copolymer or homopolymer of ethylene oxide and propylene oxide. The second method is the copolymerization of styrene, maleic acid or half ester of maleic acid, with a reactive monomer containing poly(ethylene oxide) or copolymer of ethylene oxide and propylene oxide. The first method is preferred because of ease of synthesis.

Poly(styrene-co-maleic anhydride) is commercially available from Aldrich Co. or from Elf Atochem Co. (SMA resin) or can be prepared from radical polymerization. Radical polymerization is well known in the art and can be found in R. Lenz, "Organic Chemistry of Polymerization". To control the molecular weight, chain-transfer agents may be used. Narrow molecular weight distribution (Mw/Mn<1.5) is preferred. To control the molecular weight distribution, Atom Transfer Radical Polymerization (ATRP) or Group Transfer Polymerization(GTP) are preferred.

In addition to styrene, substituted styrenes can also be used in the invention. Examples of a substituted styrene include p-methyl styrene, p-t-butyl styrene, p-chlorostyrene, p-bromostyrene, o-chlorostyrene, o-bromostyrene, 1,3,5-trichlorostyrene, 1,3,5-tribromostyrene, o-fluorostyrene, p-fluorostyrene, pentafluorostyrene, p-hydroxystyrene, p-pentylstyrene, etc.

Maleic anhydride is the preferred comonomer used in the invention but other anhydride monomers can also be used, such as succinic anhydride, and itaconic anhydride. Poly(styrene-co-vinyl anhydride) can be reacted with hydroxy or amine terminated poly(ethylene oxide), a copolymer of ethylene oxide and propylene oxide, or with the hydroxy- or amine-terminated hydrophobic alkyl or aryl functional groups to adjust the hydrophilicity and surface activity of the final polymers. Examples of poly(ethylene oxide-co-propylene oxide) are Jeffamine® 506, and Jeffamine® 508. Examples of poly(ethylene oxide-co-propylene oxide-co-ethylene oxide) are Pluronic® 25R4, 25R8, F88, F104, and L44. Examples of amine- or hydroxy-terminated hydrophobic alkyl or aryl groups are aniline, aminodiphenylmethane, Surfynol® 104 and Surfynol® 440 (Air Products Co.), 6-aminohexane, 12-aminododecane, 6-hexanol, 8-octanol, phenol, etc.

In the present invention, any of the known organic pigments can be used. Pigments can be selected from those disclosed, for example, in U.S. Pat. Nos. 5,026,427; 5,085,698; 5,141,556; 5,160,370 and 5,169,436, the disclosures of which are hereby incorporated by reference. The exact choice of pigment will depend upon the specific color reproduction and image stability requirements of the printer and application. For four-color printers, a combination of cyan, magenta, yellow, and black (CMYK) pigments should be used. An exemplary four color set is copper phthalocyanine (pigment blue 15), quinacridone magenta (pigment red 122), pigment yellow 74 or pigment yellow 155 and carbon black (pigment black 7). Another exemplary four color set is bis(phthalocyanyl-alumino)tetra-phenyldisiloxane cyan pigment, quinacridone magenta (pigment red 122), pigment yellow 74 or pigment yellow 155 and carbon black (pigment black 7). In a preferred embodiment of the invention, the pigment has a particle size of from about 10 nanometers to about 1000 nanometers.

As noted above, the ink jet ink composition employed in the invention comprises from about 0.5% to about 30% by weight of a pigment. In a preferred embodiment of the invention, the ink composition comprises from about 1% to about 5% by weight of the pigment.

The carrier employed in the process of the invention can be water or a mixture of water and at least one water soluble co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen-containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A humectant is employed in the ink jet composition employed in the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2, 6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition employed in the invention is diethylene glycol, glycerol, or diethylene glycol monobutylether. The humectant may be present in any amount effective for the intended purpose. In general, good results have been obtained when the humectant is present in an amount of up to about 70% by weight of the ink jet ink composition, preferably from about 5 to about 50%.

Ink Preparation

A preferred method for making the inks employed in the invention is disclosed in U.S. Pat. No. 5,679,138, the disclosure of which is hereby incorporated by reference. In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, color, hue, saturation density, and print area coverage for the particular application.

In the case of organic pigments, the ink may contain up to approximately 30% pigment by weight, preferably approximately 1.0 to 5%, by weight of the total ink composition for most thermal ink jet printing applications. The amount of aqueous carrier medium is in the range of approximately 70 to 99.8 weight %, preferably approximately 90 to 99.8 weight %, based on the total weight of the ink. A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have a pH in the range of 5 to 9. Anionic and cationic surfactants may be used in the invention as disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont Corp. and the Fluorads® from the 3M Co.

Acceptable viscosity's are no greater than 20 centipoise, and preferably in the range of about 1.0 to about 10.0, preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant (0–70 wt. %) is added to help prevent the ink from drying out or crusting in the orifices of the printhead. A preferred humectant for the inks employed in the present invention is a mixture of glycerol and diethylene glycol at a final concentration of between 5 and 50 wt. %. A penetrant (0–10 wt. %) may be added to help the ink penetrate the receiving substrate, especially when the substrate is a highly sized paper. A preferred penetrant for the inks employed in the present invention is n-propanol at a final concentration of 1–6 wt. %. A biocide (0.01–1.0 wt. %) may be added to prevent unwanted microbial growth which may occur in the ink over time. A preferred biocide for the inks employed in the present invention is Proxel® GXL (Zeneca Colours Co.) at a final concentration of 0.05–0.5 wt. %. Additional additives which may optionally be present in ink jet inks include thickeners, conductivity enhancing agents, anti-kogation agents, drying agents, and defoamers.

The ink jet inks employed in this invention are employed in ink jet printing wherein liquid ink drops are applied in a controlled fashion to an ink receptive layer substrate, by ejecting ink droplets from the plurality of nozzles, or orifices, in a print head of ink jet printers.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The following examples further illustrate the invention.

EXAMPLES

Example 1

General Synthesis Procedure

The general synthesis of SMA graft copolymers is as follows. In a pre-dried flask, dry tetrahydrofuran (THF) was added. To the THF, SMA was added to make a 30% by wt. solution. 30% by wt. solutions were also made in similar fashions for aniline, aminodiphenyl methane, Jeffamine® 506 and 508 amine-terminated poly(ethylene oxide-co-propylene oxide) (Huntsman Chemical Co.). The Mn are 1420 and 2900 and PPO/PEO ratios are 3/19 and 10/32 for Jeffamine® 506 and 508 respectively.

The reactions were run at room temperature for 24 hrs in 60 mL Nalgene bottles with stir magnets. The desired amount of SMA was added to the flask, followed by the quick addition of the desired amines. The various amine solutions were combined with respect to the equivalents of maleic anhydride contained in the SMA. Individual components are listed in Table 1.

TABLE 1

| Polymer | Poly(styrene-co-maleic anhydride) | % Maleic Anhydride | Equivalent* | Jeffamine ® |
|---|---|---|---|---|
| P-1 | Aldrich 44,239-9 | 32 | 1 | 506 |
| P-2 | Aldrich 44,239-9 | 32 | 0.8 | 506 |
| P-3 | Aldrich 44,239-9 | 32 | 0.6 | 506 |
| P-4 | Aldrich 44,239-9 | 32 | 0.8 | 506 |
| P-5 | Aldrich 44,240-2 | 25 | 1 | 506 |
| P-6 | Aldrich 44,240-2 | 25 | 0.8 | 506 |
| P-7 | Aldrich 44,240-2 | 25 | 0.6 | 506 |
| P-8 | Aldrich 44,240-2 | 25 | 1 | 506 |
| P-9 | Aldrich 44,240-2 | 25 | 0.8 | 506 |
| P-10 | Elf-Atochem SMA 2526 | 32 | 0.4 | 506 |
| P-11 | Elf-Atochem SMA 2526 | 32 | 0.2 | 506 |
| P-12 | Aldrich 44,239-9 | 32 | 1 | 508 |
| P-13 | Aldrich 44,239-9 | 32 | 0.8 | 508 |
| P-14 | Aldrich 44,239-9 | 32 | 0.6 | 508 |
| P-15 | Aldrich 44,239-9 | 32 | 0.8 | 508 |
| P-16 | Aldrich 44,240-2 | 25 | 1 | 508 |
| P-17 | Aldrich 44,240-2 | 25 | 0.8 | 508 |
| P-18 | Aldrich 44,240-2 | 25 | 0.6 | 508 |

*Equivalent is the percent of maleic anhydride reacted with Jeffamine ® 506 or Jeffamine ® 508.

Pigment Stability Study

Magenta pigment dispersion (Batch #1) was used as a model study. Sunfast Quinacridone Magenta Pigment Red 122® (Sun Chemical Co.) was milled in the presence of sodium oleoyl methyl taurate (Na-OMT). The % pigment was 11.83%, the % Na-OMT was 3.55%, the % solid was 15.38% and the rest was water. The milled pigment was added with suitable amounts of humectants and polymeric stabilizer to form the pigmented ink.

The ink formulation comprised 30% humectant (25% diethylene glycol and 5% diethylene glycol monobutyl ether), 3% magenta pigment, and 1.5% polymer stabilizer. For every 10 g of pigmented ink, the composition of each ingredient was: 2.54 g magenta Batch #1, 0.15 g polymeric stabilizer, 2.5 g of diethylene glycol, 0.5 g diethylene glycol monobutylether, and 4.31 g water.

The pigmented ink was placed in a 60° C. oven for one week and the particle size was measured by a Honeywell UPA particle sizer. The number average particle size of the magenta pigment dispersion stabilized by various polymeric dispersants is reported below. A smaller number indicated that the pigment is more stable. The results are shown in Table 2.

TABLE 2

| Polymer | Particle Size(nm) |
|---|---|
| No Polymer | 187 |
| SMA 1440H* (comparison polymer 1) | 150 |
| SMA 2625H* (comparison polymer 2) | 159 |
| SMA 17352H* (comparison polymer 3) | 174 |
| P-8 | 43.4 |
| P-5 | 45.7 |
| P-7 | 49.7 |
| P-6 | 53.6 |
| P-9 | 60.2 |
| P-2 | 64.1 |
| P-4 | 71.6 |
| P-1 | 87.8 |
| P-3 | 99.5 |

*SMA 1440H, SMA 2625H and SMA 17352H are commercially available from Elf Atochem Co. (EP 0 889 102 and U.S. Pat. No. 5,948,843)

The above table shows that the graft copolymers employed in the invention have a lower particle size, thus being more effective in preventing the pigment from agglomeration, than the comparison polymers of the prior art.

The invention has been described in detail with particular reference to certain preferred embodiments thereof, but it will be understood that variations and modifications can be effected within the spirit and scope of the invention.

What is claimed is:

1. An ink jet printing method comprising the steps of:

A) providing an ink jet printer that is responsive to digital data signals;

B) loading said printer with ink jet recording elements;

C) loading said printer with an ink jet ink composition; and

D) printing on said ink jet recording element using said ink jet ink in response to said digital data signals;

wherein said ink jet ink composition comprises from about 0.5% to about 30% by weight of a pigment, a carrier, a humectant and a dispersant in a ratio of dispersant:pigment from about 0.1:1 to about 5:1; said dispersant being a graft copolymer having the following formula:

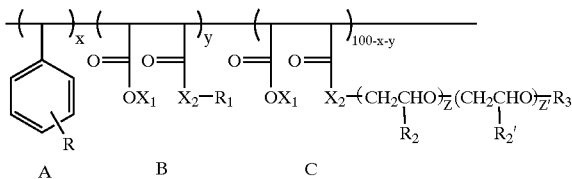

wherein

R is H, halogen, an alkyl group of from about 1 to about 15 carbon atoms or an aryl group of from about 6 to about 18 carbon atoms;

$R_1$ is H, an alkyl group of from about 1 to about 15 carbon atoms, an aryl group of from about 6 to about 18 carbon atoms, arylalkyl, or a polydimethylsiloxane;

$X_1$ is H, Na or K;

$X_2$ is NH or O;

$R_2$ and $R_2'$ are H or $CH_3$;

$R_3$ is H, $CH_3$, $C_2H_5$ or $C_3H_7$;

x is from about 30 to about 90 weight ratio;

y is from 0 to about 30 weight ratio; and z and z' are from about 3 to about 50.

2. The method of claim 1 wherein said graft copolymer is prepared from poly(styrene-co-maleic anhydride) and poly(ethylene oxide-co-propylene oxide).

3. The method of claim 1 wherein said graft copolymer is prepared from poly(styrene-co-maleic anhydride) and poly(ethylene oxide).

4. The method of claim 2 wherein the number average molecular weight of said poly(styrene-co-maleic anhydride) is from about 1000 to about 3000.

5. The method of claim 3 wherein the number average molecular weight of said poly(styrene-co-maleic anhydride) is from about 1000 to about 3000.

6. The method of claim 2 wherein the number average molecular weight of said poly(ethylene oxide-co-propylene oxide) is from about 500 to about 3000.

7. The method of claim 3 wherein the number average molecular weight of said poly(ethylene oxide) is from about 500 to about 3000.

8. The method of claim 2 wherein the mole % maleic anhydride of said poly(styrene-co-maleic anhydride) is from about 20% to about 40%.

9. The method of claim 3 wherein the mole % maleic anhydride of said poly(styrene-co-maleic anhydride) is from about 20% to about 40%.

10. The method of claim 2 wherein said poly(ethylene oxide-co-propylene oxide) is amine-terminated.

11. The method of claim 3 wherein said poly(ethylene oxide) is amine-terminated.

12. The method of claim 10 wherein the mole % ethylene oxide of said poly(ethylene oxide-co-propylene oxide) is from about 30% to about 90%.

13. The method of claim 1 wherein R is H.

14. The method of claim 1 wherein x is from about 40 to about 80 weight ratio.

15. The method of claim 1 wherein $R_1$ is $C_6H_6$, $C_6H_{13}$, $C_8H_{17}$ or $C_{10}H_{21}$.

16. The method of claim 1 wherein said humectant is present in an out 70% by weight of said composition.

17. The method of claim 1 wherein said carrier is water.

18. The method of claim 1 wherein said pigment is present in an out 1% to about 5% by weight.

19. The method of claim 1 wherein said dispersant is present in a pigment from about 0.25:1 to about 2.5:1.

* * * * *